United States Patent
Bompay et al.

(10) Patent No.: US 6,793,851 B1
(45) Date of Patent: Sep. 21, 2004

(54) PROCESS FOR MANUFACTURING INFRASTRUCTURES BASED ON VITRIFIED BLAST-FURNACE SLAG AND ADDITIVE USED

(75) Inventors: Jean-Yves Bompay, Fesnoy-le-Luat (FR); Jean-Michel Prunevieille, Vaucresson (FR)

(73) Assignee: Mecaroute, Nanterre (FR)

( * ) Notice: Subject to any disclaimer, the term of this patent is extended or adjusted under 35 U.S.C. 154(b) by 0 days.

(21) Appl. No.: 09/534,987

(22) Filed: Mar. 27, 2000

(51) Int. Cl.[7] .............................. E01C 7/10; E01C 7/14; C04B 7/21; C04B 7/34
(52) U.S. Cl. .......................... 264/31; 404/75; 106/715; 106/735; 106/776; 106/782; 106/791
(58) Field of Search ........................... 264/31; 404/75; 106/715, 735, 776, 782, 791

(56) References Cited

U.S. PATENT DOCUMENTS

| | | | | |
|---|---|---|---|---|
| 2,937,581 A | * | 5/1960 | Havelin et al. | 404/76 |
| 3,096,188 A | * | 7/1963 | Maydl | 106/679 |
| 3,230,103 A | * | 1/1966 | Minnick | 106/707 |
| 3,398,662 A | * | 8/1968 | Takata et al. | 222/627 |
| 3,501,323 A | * | 3/1970 | Moorehead | 264/211.11 |
| 3,565,648 A | * | 2/1971 | Mori et al. | 106/707 |
| 4,038,095 A | * | 7/1977 | Nicholson | 106/707 |
| 4,715,896 A | * | 12/1987 | Berry | 106/707 |
| 5,351,894 A | * | 10/1994 | Longhurst et al. | 241/21 |
| 5,766,297 A | * | 6/1998 | Piniecki | 65/141 |

FOREIGN PATENT DOCUMENTS

| | | | | |
|---|---|---|---|---|
| BE | 408897 | | 4/1935 | |
| EP | 0188618 A1 | * | 7/1986 | C04B/7/21 |
| EP | 0 534 857 A1 | | 3/1993 | |
| FR | 2 329 609 | | 5/1977 | |
| FR | 2 428 619 | | 1/1980 | |
| FR | 2 588 855 | | 4/1987 | |
| GB | 2 137 186 A | | 10/1984 | |
| JP | 55-155086 A | * | 12/1980 | C09K/17/00 |
| JP | 02-266005 A | * | 10/1990 | E01C/7/24 |

* cited by examiner

*Primary Examiner*—Michael Colaianni
*Assistant Examiner*—Michael I. Poe
(74) *Attorney, Agent, or Firm*—Connolly Bove Lodge & Hutz, LLP

(57) ABSTRACT

A process for constructing infrastructures, in which aggregates, vitrified blast-furnace slag, a pulverulent activator and water are mixed together, the mix is spread out over the ground, compacted and left to harden, and in which a particulate slag and a ready-prepared additive containing, on the one hand, the activator and, on the other hand, dry ground vitrified slag having a particle size of less than 500 $\mu$m are added to the aggregate is provided. Further provided is the additive for the construction of infrastructures according to the said process, which additive includes, on the one hand, a pulverulent activator and, on the other hand, dry ground vitrified slag having a particle size of less than 500 $\mu$m.

9 Claims, No Drawings

PROCESS FOR MANUFACTURING INFRASTRUCTURES BASED ON VITRIFIED BLAST-FURNACE SLAG AND ADDITIVE USED

FIELD OF THE INVENTION

The present invention relates to the construction of road and motorway infrastructures, such as base courses and foundation courses of roads, or of civil engineering infrastructures, such as rafts for building foundations, for airport parking or storage areas, for railway platforms or for port quays or wharfs. Generically, this collection of uses will be referred to hereafter by the term "infrastructures".

BACKGROUND OF THE INVENTION

It is well known in the manufacture of these infrastructures to use mixes of aggregates, of a hydraulic binder, comprising a slag and an activator, and of water (the gravel-slag or sand-slag technique). Next, the mix is spread out over the surface to be treated and is compacted according to particular specifications.

The aggregates consist, in a known manner, of grit or sand, for example, coming from quarries.

The slag used is a by-product of the manufacture of pig iron in blast furnaces and is consequently inexpensive. It is essentially composed of three oxides, namely $CaO$, $SiO_2$ and $Al_2O_3$, which may be in the form of oxides, silicates, aluminates or aluminosilicates. On leaving the blast furnace, the slag is vitrified and made into particulate form, essentially using two methods. According to the first method, the slag leaving the blast furnace at 1500° C. is sent, in the form of a fluid stream, into a tank whose walls include water jets; the slag forms particles having surface asperities: it is called "granulated" slag. The particles of granulated slag have dimensions of less than 5 mm, their average size generally being about 0.5 mm; the granulated slag contains approximately 1% of fines having a particle size of less than 80 micrometers. According to a second method, the slag is cooled by mechanically and hydraulically spraying it at high speed into the air; the particles are in the form of nodules having a spheroidal shape and a foam structure; it is called "pelletized" slag. The particles of pelletized slag have a particle size of less than 80 mm, 95% of particles generally having average sizes of less than 20 mm; the pelletized slag contains virtually no fines.

The granulated or pelletized slag is generally used in preground form. By pregrinding, the particle size of the entire product is reduced and the proportion of fines of less than 80 $\mu$m is increased.

It is also known to add an activator in pulverulent form to the slag. The activation of the vitrified blast-furnace slag consists, firstly, in the presence of water, in attacking the slag with a basic agent, the purpose of which is to dissolve a small amount of slag. Thus, by successive crystallization from the aqueous phase, solid hydrated compounds are formed, which results in the mix setting and hardening. The activator is defined in French Standard NF P 98–107; it may consist of lime, calcium sulphate or both these, it may also contain soda or potash, silica and also a product having, in addition, hydraulic binder properties.

The mix of aggregates, slag, activator and water must principally have the following properties.

Firstly, the mix must not set immediately, so as to be able to be spread out over the ground. It is desirable to have a workability time at least greater than 12 hours, generally between 15 and 30 hours. When the mix is spread out over the ground, it is compacted using a specified process and to a specified value. Setting then starts and may last 4 to years, the mix after compacting nevertheless being already sufficiently load-bearing in order for it to be possible, in particular, to drive over it immediately.

Secondly, the compacted mix must comply with mechanical performance standards. The mechanical performance characteristics taken into account are the 360-day tensile strength (Rt) and the 360-day elastic modulus (E), the values of which are estimated from test pieces manufactured in the laboratory. It has been found that the 360-day mechanical performance characteristics depended on the particle size of the granulated or pelletized slag and that it was favourable to use a preground slag, the particles of which are smaller than 2 mm and contain approximately 10% of fines.

However, the storage properties of the slag depend on the composition of the latter. This is because, when an iron ore coming from mines in Lorraine (minette ore) is used in blast furnaces and worked according to the Thomas process, a stable and storable preground slag is obtained and it is possible to achieve 360-day mechanical performance characteristics according to the standards, even after the preground slag has been stored. However, when the slag comes from the treatment of another ore, for example, haematite, the preground slag very often does not comply with the mechanical performance standards; this is because it has been found that, during storage, the proportion of fines decreases in a random fashion during storage; it may thus go from 10 to 4% in a few hours.

DETAILED DESCRIPTION OF THE INVENTION

Now, It seems that the fines content of the slag used is an essential datum for achieving the required performance characteristics of the mix. The object of the invention is therefore to guarantee a sufficient content of fines in the slag at the time of mixing in the mixer and to obtain workable mixes which meet the 360-day performance standards.

The subject of the invention is therefore a process for constructing infrastructures, especially civil engineering infrastructures or road infrastructures, in which aggregates, vitrified blast-furnace slag, a pulverulent activator and water are mixed together, and the mix is spread out over the ground, compacted and left to harden, characterized in that a particulate slag and a ready-prepared additive containing, on the one hand, the activator and, on the other hand, dry ground vitrified slag having a particle size of less than 500 $\mu$m are added to the aggregates. Preferably, the particulate slag added to the aggregates is an as-granulated or as-pelletized slag which is not preground.

The ground vitrified slag is obtained by passing a granulated or pelletized slag through a suitable mill, for example a ball mill; the slag is preferably dried during the grinding until its water content is less than 0.5% by weight. The ground slag has a particle size of less than 500 $\mu$m, preferably less than 100 $\mu$m, for at least 80% by weight.

The activator may be any known activator. However, it is preferred to use an activator consisting, for more than 95% by weight, of lime or of calcium sulphate or, more particularly preferably, of a mixture of lime and calcium sulphate; the activator may optionally contain small amounts of soda or potash. Advantageously, the activator has an average particle size of between 0 and 500 $\mu$m for at least 95% of its weight and a moisture content of less than 0.5% by weight.

For more than 95% by weight, the additive preferably consists of a mixture having the following formulation by weight:

| | |
|---|---|
| calcium sulphate | 25 to 45% |
| lime | 2 to 6% |
| dry ground vitrified slag | qsp 100%. |

Further known formulation adjuvants for this type of mix (aggregates/slag/activator/water) may be introduced into the additive, such as a deflocculant, a setting accelerator or retarder, or steelworks scoria.

The amount of additive added is generally between 1 and 3% by weight with respect to the weight of the mix (aggregate/slag/additive/water); in this way, approximately 0.5 to 2.0% by weight of slag fines having a particle size of less than 80 μm are introduced into the mix.

The vitrified blast-furnace slag, which is added to the aggregates in the unpreground particulate state, may, according to the invention, be an as-granulated slag, which generally contains at most approximately 1% fines, or an as-pelletized slag, which contains substantially no fines. Using an unpreground slag avoids having to grind all of the slag, something which constitutes a first advantage over the prior art. Furthermore, it is completely unnecessary to dry all of the slag in order to avoid the reduction in the amounts of fines since the necessary fines are provided by the additive, so that the only fraction of slag to be dried is the ground slag which forms a constituent of the additive. However, it is possible to use a preground slag instead of the as-produced particulate slag, accepting that the abovementioned first advantage would be lost, and, in this case, it is of little matter whether the fines of the preground slag remain during storage or not, since a sufficient and controlled amount of slag fines is provided by the additive.

The subject of the present invention is also the additive for the construction of infrastructures according to the above process, characterized in that it includes, on the one hand, a pulverulent activator and, on the other hand, dry ground vitrified slag having a particle size of less than 500 μm.

Preferably, the dry ground slag has a water content of less than 0.5% by weight.

Advantageously, the activator consists, for more than 95% by weight, of lime, calcium sulphate or a mixture of lime and calcium sulphate; it may furthermore contain sodium or potassium hydroxide.

Preferably, the activator has an average particle size of between 0 and 500 μm and a moisture content of less than 0.5% by weight.

Preferably, more than 95% by weight of the additive consists of a mixture having the following formulation by weight:

| | |
|---|---|
| calcium sulphate | 25 to 45% |
| lime | 2 to 6% |
| dry ground vitrified slag | qsp 100%. |

The additive may also contain known formulation adjuvants for slag-based mixes in order to produce infrastructures.

The illustrative and non-limiting example given below will allow the invention to be more clearly understood.

EXAMPLE

The additive used has the following formulation by weight:
- 36% calcium sulphate;
- 4% lime;
- 60% ground vitrified slag having a particle size of less than 100 μm with a water content of 0.5% by weight.

In order to construct a road infrastructure, a mix having the following formulation is produced:
- 45% Seine (Anneville) fine siliceous-limestone gravel (5 mm/20 mm) (IC 60);
- 45.5% of a Beauce (Baignolet) limestone sand (less than 6 mm) (IC 100);
- 8% of an as-granulated slag produced from haematite as iron ore (from Dunkerque) having an activity coefficient of 23 according to the NF P 98–108 standard;
- 1.5% of the additive defined above.

The various constituents of the mix are mixed with water so as to obtain a mix having 8.7% water and the mix is spread. Next, it is compacted until an PMO density of 2.08 is obtained (PMO="procto-modified optimum").

The mechanical performance characteristics of the compacted mix are measured as indicated below:

a) Post-setting Strength

Tensile strength tests were carried out on vibro-compression test pieces having the dimensions 16×32 cm with the "Procto-modified optimum" (PMO) parameters according to the NF P 98–114 standard at 90 days and at 360 days. The results are as follows:

| | |
|---|---|
| 90-day tensile strength (Rt) | 0.73 MPa |
| 360-day Rt | 0.81 MPa |
| 90-day elastic modulus E | 14,880 MPa |
| 360-day E | 16,980 MPa |

According to the NF P 98–118 standard, the mix is therefore classified as G2.

b) Workability Time

The test consists in measuring the speed of propagation of a wave through the material treated. The more it has hardened, the slower the speed.

The workability time is the time that elapses between an instant $T_0$ just after mixing, when the speed of propagation of the wave is $v_0$, and the instant when the speed is no more than 60% of $v_0$.

At a temperature of 20° C., a workability time of 15 hours 30 minutes was obtained.

What is claimed is:

1. Process for constructing infrastructures, in which aggregates, vitrified blast-furnace particulate slag, a pulverulent activator and water are mixer together to form a mix, and the mix is spread out over the ground, compacted and left to harden, characterized in that the particulate slag and a ready-prepared additive are added to the aggregates prior to mixing with the water, wherein:
   the particulate slag comprises an as-granulated or as-pelletized particulate slag that is not preground and that contains no more than approximately 1% by weight slag fines,
   the ready-prepared additive comprises, on the one hand, the activator and, on the other hand, dry ground vitrified slag having a particle size of less than 500 μm, and the mix comprises approximately 0.5 to 2% by weight of slag fines.

2. Process according to claim 1, characterized in that the activator has an average particle size of between 0 and 500 μm for at least 95% of its weight and a moisture content of less than 0.5% by weight.

3. Process according claim 1, characterized in that more than 95% by weight of the additive consists of a mixture having the following formulation by weight:

| | |
|---|---|
| calcium sulphate | 25 to 45% |
| lime | 2 to 6% |
| dry ground vitrified slag | qsp 100%. |

4. Process according claim 1, characterized in that an amount of additive of between 1 and 3% by weight with respect to the total of the mix (aggregates/slag/additive/water) is added to the said mix.

5. Process according to claim 1, characterized in that the dry ground slag has a water content of less than 0.5% by weight.

6. Process according to claim 5, wherein the activator consists, for more than 95% by weight, of lime, calcium sulphate or a mixture of lime and calcium sulphate.

7. Process according to claim 1, characterized in that the activator consists, for more than 95% by weight, of lime, calcium sulphate or a mixture of lime and calcium sulphate.

8. Process according to claim 7, characterized in that the activator contain sodium or potassium hydroxide.

9. Process according to claim 8, wherein the activator as an average particle size of between 0 and 500 μm for at least 95% of its weight and a moisture content of less than 0.5% by weight.

* * * * *